US007802217B1

(12) United States Patent
Gopinath et al.

(10) Patent No.: US 7,802,217 B1
(45) Date of Patent: Sep. 21, 2010

(54) LEAKAGE POWER OPTIMIZATION CONSIDERING GATE INPUT ACTIVITY AND TIMING SLACK

(75) Inventors: Venkatesh P. Gopinath, Fremont, CA (US); Krishnan Sundaresan, Sunnyvale, CA (US); Jaewon Oh, Cupertino, CA (US); Ke Peng, Fremont, CA (US); Robert E. Mains, Morgan Hill, CA (US)

(73) Assignee: Oracle America, Inc., Redwood City, CA (US)

( * ) Notice: Subject to any disclaimer, the term of this patent is extended or adjusted under 35 U.S.C. 154(b) by 316 days.

(21) Appl. No.: 12/011,310

(22) Filed: Jan. 25, 2008

(51) Int. Cl.
  G06F 9/45 (2006.01)
  G06F 17/50 (2006.01)
(52) U.S. Cl. .................. 716/6; 716/1; 716/2; 716/4; 716/5; 703/19
(58) Field of Classification Search .................. 716/1, 716/2, 4–6; 703/19
  See application file for complete search history.

(56) References Cited

U.S. PATENT DOCUMENTS 7,441,211 B1 * 10/2008 Gupta et al. .................. 716/2

2008/0040698 A1 * 2/2008 Ferrari et al. .................. 716/6

* cited by examiner

Primary Examiner—Paul Dinh
Assistant Examiner—Nha T Nguyen
(74) Attorney, Agent, or Firm—Martine Penilla & Gencarella, LLP (57) ABSTRACT

Broadly speaking, the embodiments of the present invention fill the need for a method of designing semiconductor device chips with reduced power consumption. The embodiments describe methods that are activity-based and are used for power optimization. The embodiments provide methods of selecting instances of a block of a chip to be replaced by either gate-length bias (GBIAS) cells or high-threshold-voltage (HVT) cells with minimal impact (little or no impact) on the overall performance of the chip. Only instances not on the critical path(s) are selected. Instances with low activities and high slack thresholds are chosen to be replaced by either GBIAS cells or HVT cells. By replacing the instances with low activities and high slack threshold, the performance impact on the block and chip is minimized. The replacement results in net power reduction, which is critical to advanced device technologies.

20 Claims, 9 Drawing Sheets

| Block Name | Total Number Of Instances In Design | Activity Factor Threshold | Number of Instances Replaced (% of Total) | Net Block Power Reductions Compared To SVT | |
|---|---|---|---|---|---|
| | | | | Leakage | Total |
| rk_cb_a0_fifo | 1054 | 25% | 134 (12.71%) | 3.81% | 0.64% |
| rk_cb_utlb | 2686 | 30% | 749 (27.88%) | 10.18% | 8.41% |
| rk_cb_exe_pipe | 2910 | 25% | 737 (25.33%) | 8.91% | 1.52% |
| rk_cb_br_pipe | 1689 | 25% | 519 (30.73%) | 3.13% | 2.21% |
| rk_cb_dtag | 830 | 55% | 286 (34.45%) | 9.08% | 2.30% |

Fig. 4I

LEAKAGE POWER OPTIMIZATION CONSIDERING GATE INPUT ACTIVITY AND TIMING SLACK

BACKGROUND

Leakage power is one of the key challenges faced by the semiconductor device industry today. Sub-threshold leakage current is the dominant cause for leakage power at 130-nm and below and this trend is expected to continue in the future, especially since both the number of devices on a chip and leakage current of each device are increasing steadily. Leakage power optimization techniques can be divided into two groups, those addressing "standby leakage", and "runtime leakage". The former uses techniques like use of sleep transistors, transistor stacking, input vector control, etc. that reduce the leakage current when the block/cells are idle. The latter uses techniques that reduce the threshold voltage for cells statically (at design time) or dynamically (at runtime).

Reducing the threshold voltage improves speed significantly but makes devices leakier. On the other hand, using high threshold voltage devices makes circuits operate slower but leak less. Given that the technology trend is to lower threshold voltages, designers often use high-speed gates on the critical path(s) and high threshold voltage gates on the non-critical paths. The use of gates with different threshold voltages is achieved by using extra masks and lithography steps during fabrication, which increase manufacturing cost.

As a consequence, there is a need for a method of designing semiconductor device chips with reduced power consumption.

SUMMARY

Broadly speaking, the embodiments of the present invention fill the need for a method of designing semiconductor device chips with reduced power consumption. The embodiments describe methods that are activity-based and are used for power optimization. The embodiments provide methods of selecting instances of a block of a chip to be replaced by either gate-length bias (GBIAS) cells or high-threshold-voltage (HVT) cells with minimal impact (little or no impact) on the overall performance of the chip. Only instances not on the critical path(s) are selected. Instances with low activities and high slack thresholds are chosen to be replaced by either GBIAS cells or HVT cells. By replacing the instances with low activities and high slack threshold, the performance impact on the block and chip is minimized. The replacement results in net power reduction, which is critical to advanced device technologies.

It should be appreciated that the present invention can be implemented in numerous ways, including as a process, an apparatus, a system, a device, or a method. Several inventive embodiments of the present invention are described below.

In one embodiment, a method of modifying a design of a block of a chip to reduce a net power consumption of the block is provided. The method includes (1) read in design data of the block, and (2) run a static timing engine to calculate path delays and a power estimation tool to calculate power consumption on the design data of the block. The method also includes (3) select an instance of the block. The selected instance has not been selected before the method starts. The method further includes (4) determine if the instance is on at least one critical path. If the instance is on the at least one critical path, return to step (3). If the instance is not on the at least one critical path, obtain an activity factor (AF) from the power estimation tool and a slack from the static timing engine and move to step (5). In addition, the method includes (5) determine if the instance meets a criteria of low-AF and a first criteria of high-slack. If the instance meets the criteria of low-AF and the first criteria of high-slack, the instance is replaced with a gate-length bias (GBIAS) cell. If the instance does not meet the criteria of low-AF and the first criteria of high-slack, move to step (6). Additionally, the method includes (6) determine if all instances in the block has been selected. If all replaceable instances in the block have been selected, stop the method. A revised design of the block has been created by the method and the revised design of the block reduces the net power consumption of the block and meets the timing constraints with the specified margin. If not all instances have been selected, go to step (3).

In another embodiment, a method of modifying a design of a block of a chip to reduce a net power consumption of the block is provided. The method includes (1) read in design data of the block, and (2) run a static timing engine and a power estimation tool on the design data of the block. The method also includes (3) select an instance of the block. The selected instance has not been selected before the method starts. The method further includes (4) determine if the instance is on at least one critical path. If the instance is on the at least one critical path, return to step (3). If the instance is not on the at least one critical path, obtain an activity factor (AF) from the power estimation tool and a slack from the static timing engine and move to step (5). In addition, the method includes (5) determine if the instance meets a criteria of low-AF and a first criteria of high-slack. If the instance meets the criteria of low-AF and the first criteria of high-slack, the instance is replaced with a gate-length bias (GBIAS) cell. If the instance does not meet the criteria of low-AF and the first criteria of high-slack, move to step (6). Additionally, the method includes (7) determine if the instance meets a criteria of high-AF and a second criteria of high-slack. If the instance meets the criteria of high-AF and the second criteria of high-slack, the instance is replaced with a high threshold voltage (HVT) cell. If the instance does not meet the criteria of high-AF and the second criteria of high-slack, move to step (8). The method also includes (8) determine if all instances in the block has been selected. If all instances in the block have been selected, move to step (9). If not all instances have been selected, go to step (3). The method further includes (9) run static timing engine on the revised design of the block, and determine if at the revised design meets timing constraints for the block. If the revised design meets the timing constraints for the block, return to step (1) and use the revised design of the block to provide design data. If the revised design does not meet the timing constraints for the block, stop the method.

In yet another embodiment, computer readable media including program instructions for modifying a design of a block of a chip to reduce a net power consumption of the block are provided. The computer readable media include program instructions for reading in design data of the block at step (1), and program instructions for running a static timing engine and a power estimation tool on the design data of the block at step (2). The computer readable media also include program instructions for selecting an instance of the block at step (3). The selected instance has not been selected before the program instructions start. The computer readable media further include program instructions for determining if the instance is on at least one critical path at step (4). If the instance is on the at least one critical path, return to step (3). If the instance is not on the at least one critical path, obtain an activity factor (AF) from the power estimation tool and a slack from the static timing engine and move to step (5). In addition, the computer readable media include program instructions for determining if the instance meets a criteria of low-AF and a first criteria of high-slack at step (5). If the instance meets the criteria of low-AF and the first criteria of high-slack, the instance is replaced with a gate-length bias (GBIAS) cell. If the instance does not meet the criteria of low-AF and the first criteria of high-slack, move to step (6). Additionally, the computer readable media include program instructions for determining if all instances in the block have been selected at step (6). If all instances in the block have been selected, stop the program instructions. A revised design of the block has been created and the revised design of the block reduces the net power consumption of the block. If not all instances have been selected, go to step (3).

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

As described above, reducing the threshold voltage improves device speed; however, it makes devices leakier. Using high threshold voltage (HVT) devices makes circuits operate slower but leak less. Given that the technology trend is to lower threshold voltages, designers often use standard threshold voltage (SVT) gates, which has higher-speed due to lower threshold voltage, on the critical paths and HVT (lower-leakage, lower-speed) gates on non-critical paths. The use of gates with different threshold voltages (Vth) is achieved by using extra masks and lithography steps during fabrication to change dopant concentration and/or profiles. Using extra masks and lithography steps during fabrication increase manufacturing cost.

Figure 1A:
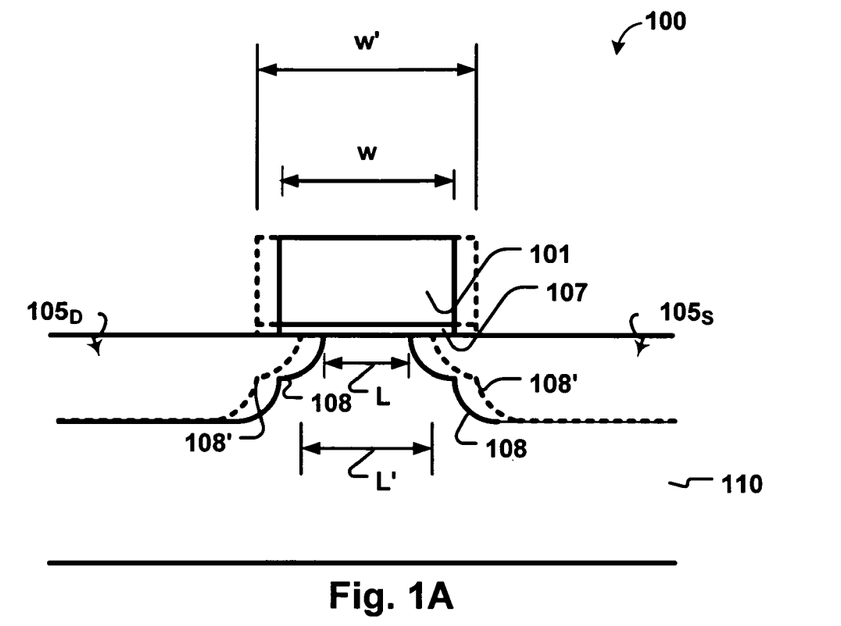
FIG. 1A shows a cross-sectional view of a metal on metal-oxide-semiconductor field-effect transistor (MOSFET), in accordance with one embodiment of the present invention.

An alternative to using gates with different Vth is gate-length biasing. This technique uses the short-channel effect to increase the gate-length and alters the Vth and hence leakage significantly. FIG. 1A shows a cross-sectional view of device cell 100, in accordance with one embodiment of the present invention. Device cell 100 is a metal-oxide-semiconductor field-effect transistor (MOSFET) and can be an N-channel or a P-channel MOSFET.

Device cell 100 has a polysilicon layer structure 101, with a dielectric layer 107 underneath. The width of the polysilicon structure 101 and the dielectric layer 107 is "W". On one side of the polysilicon structure 101, there is a source area $105_S$. On the other side of the polysilicon structure 101, there is a drain area $105_D$. The source and drain areas, $105_S$ and $105_D$, are doped with a dopant and the dopant profiles are represented by curves 108. The channel width of device 100 is "L".

Device cell 100 has a threshold voltage $Vth_{100}$. If the width W of the polysilicon structure 101 is extended to W', the dopant profiles 108 of source and drain areas would be moved outward to become profiles 108'. The channel length of the wider polysilicon width W' would become L', which is longer than L. The increased channel length would increase the threshold voltage, lower the gate speed and lower leakage current. The cell with wider polysilicon width or longer channel length described here can be called gate-length biased (GBIAS) cell. In addition to lower speed, GBIAS cell also has a marginally larger gate input capacitance and this may affect the delay of fan-in gates, which are input gates, due to extra loading. GBIAS gate has lower leakage current and can be used on gates on non-critical path to reduce leakage power. Unlike HVT gates, GBIAS gates do not require additional masks or lithography steps to make. Only the widths of polysilicon structures are widened during design. Therefore, the manufacturing cost is not increased.

Figure 1B:
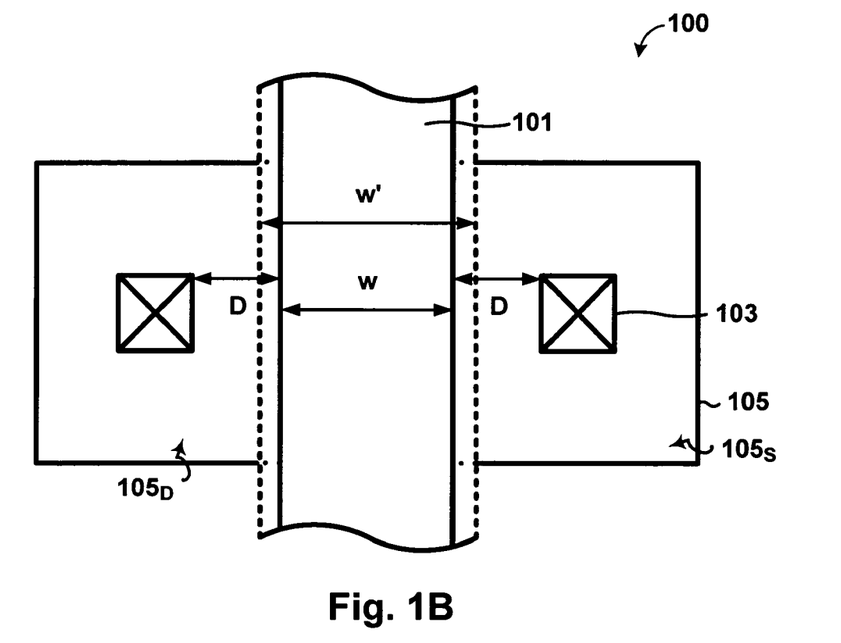
FIG. 1B shows a top view of a metal on metal-oxide-semiconductor field-effect transistor (MOSFET), in accordance with one embodiment of the present invention.

FIG. 1B shows a top view of the device cell 100 of FIG. 1A, in accordance with one embodiment of the present invention. As described above, device cell 100 has a diffusion area 105, which includes source area $105_S$ and drain area $105_D$, a polysilicon structure (or polysilicon line) 101 over the diffusion area, and two contacts 103 on both sides of the polysilicon structure 101. The distance between D 104 between polysilicon structure 101 and contacts 103 is set to ensure no leakage between contacts 103 and polysilicon structure 101. Usually distance D is set to have extra room to allow for manufacturing variation. In most cases, even after manufacturing variation is taken into consideration, the widths W of polysilicon structures can be increased by at least 5-10% without resulting in shorting or leakage between contacts 103 and polysilicon structure 101. In some instances, the widths of the polysilicon structures can be increased by 20% or more.

Therefore, it is possible to use the extra room available between contacts and gate structure (polysilicon structure) to replaced instances not on critical path(s) with GBIAS cells to reduce leakage and power consumption. The design can start with standard cells for all instances on a chip. After the initial device layout (or design) is completed, a device simulator can be used to identify instances not in the critical path to increase the width of polysilicon structures of those identified instances to lower leakage power.

As mentioned above, GBIAS gates also have higher gate capacitance. For gates that are used often, using GBIAS gates to replace standard cell could significantly increase capacitance to affect the delay of fan-in gates due to extra loading and to increase dynamic (switching) power. Therefore, it is important to replace normal gates with GBIAS gates on gates that are used less frequently, or with low activity factor (AF). In one embodiment, the AF is input AF. When a cell is active at all time, the AF of the cell is 200%, since it switches twice during a clock cycle. AF can be measured by a power simulation tool, such as JOULES of Sun Microsystems of Santa Clara, Calif. Power simulation tools, such as JOULES, can be used to simulate power consumption (or heat generated) by devices, and can be used to determine if instances are used frequently or not (or can be used to determine AF).

Figure 2:
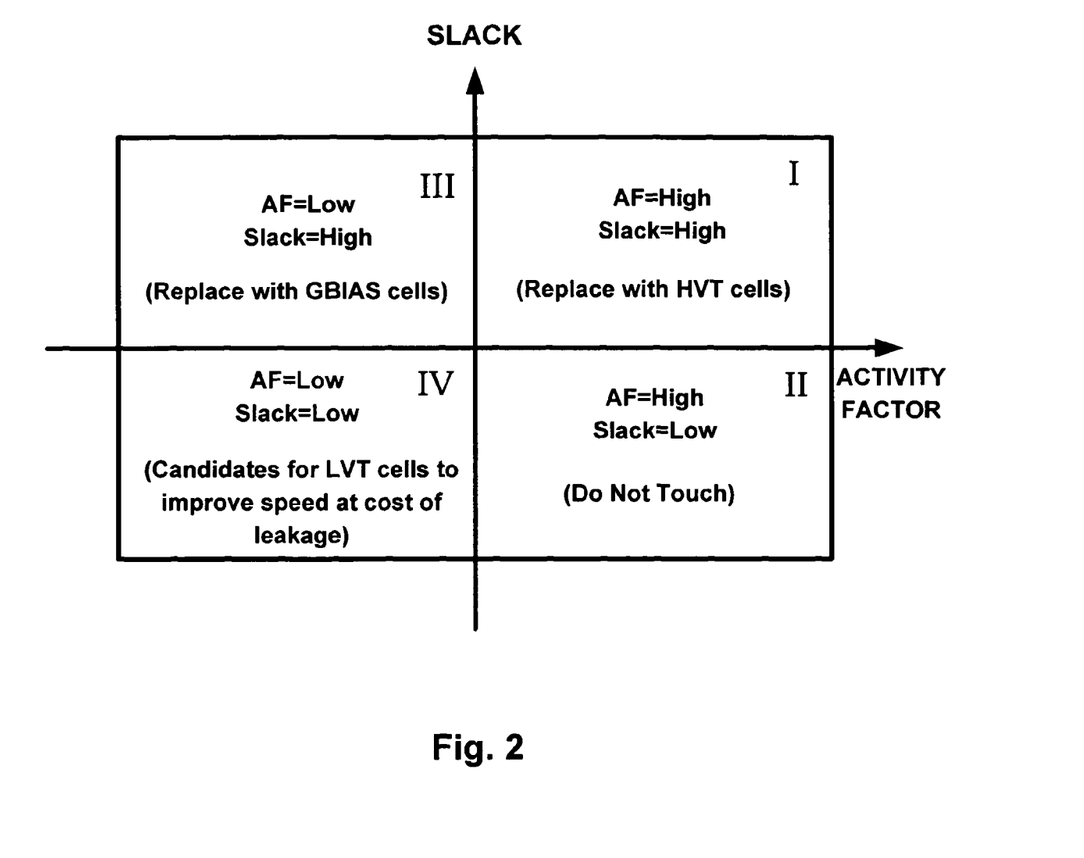
FIG. 2 shows a plot of activity factor versus slack, in accordance with one embodiment of the present invention.

A critical path is a path that has the longest timing and determines the cycle time of a design, or a block of design. FIG. 2 shows a plot of activity factors versus slacks of gates in devices of a design, in accordance with one embodiment of the present invention. Slack is a measurement of non-criticality of a path. The slack for instances on a path is measured by the subtracting timing of the path from the timing of a critical path and then dividing the net value by the timing of the critical path, as shown in equation (1). Slack can be measured by a static timing machine, such as OYSTER of Sun Microsystems of Santa Clara, Calif. Static timing engines, such as OYSTER, can be used to calculate path delays of integrated circuits (ICs), which can be used to determine if instances are critical or not.

$$\text{Slack=(timing of critical path timing of the path)/timing of critical path} \qquad (1)$$

The activity factor and slack are divided into four quadrants, with high AF and high slack in the first quadrant (I), high AF and low slack in the second quadrant (II), low AF and high slack in a third quadrant (III), and low AF and low slack in the fourth quadrant (IV). For instances with high AF (used frequently) and low slack (critical gates), they should be left as standard gates to avoid delay, as indicated in the second quadrant (II) of FIG. 2. For gates with high AF and high slack, they can be replaced with HVT cells to reduce leakage (or static power) with minimal impact on dynamic (switching) power, as indicated in the first quadrant (I) of FIG. 2. Alternatively, designers can choose to leave the cells as standard cells to save manufacturing cost. For gates with low AF and low slack (critical gates), they can be considered to be replaced with LVT (low threshold) gates to increase speed, as indicated in the fourth quadrant (IV) of FIG. 2. However, LVT cells are more leaky and would consume more power. Designers can choose to leave the cells as SVT cells as well. Similar to HVT gates, making LVT gates requires additional masks and extra lithography steps and would increase manufacturing cost. For gates that are low in AF (not used often) and has high slack (or non-critical), they can be replaced with GBIAS gates.

The matrix in FIG. 2 shows that when slack is high, the gates can be designed differently to minimize leakage power without affecting timing. When AF is high, HVT cells can be used. When AF is low, GBIAS cells can be used. As mentioned above, GBIAS cells have higher capacitance and are not ideal for instances with high activities.

Figure 3A:
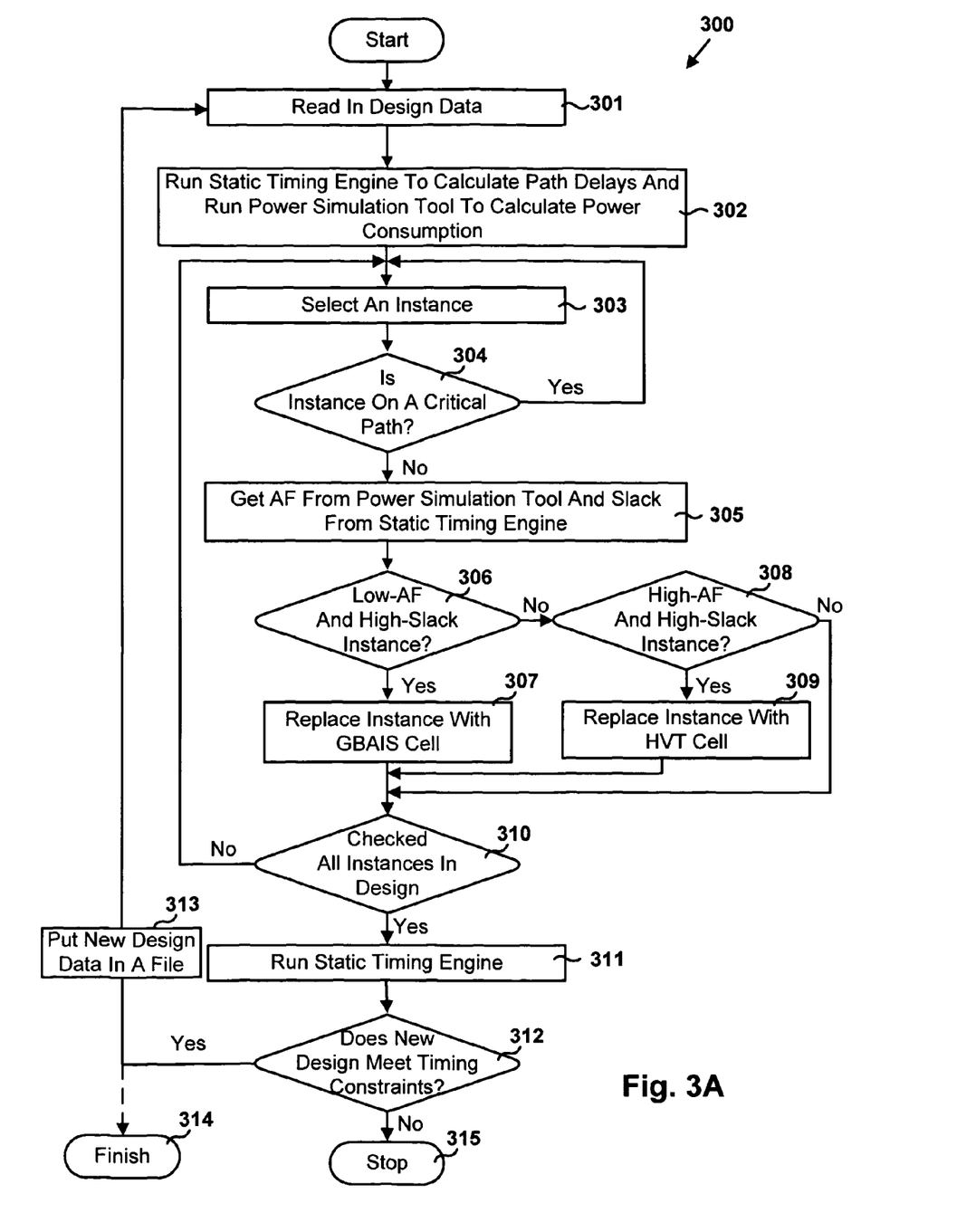
FIG. 3A shows a process flow of replacing instances of a design with power saving gates, in accordance with one embodiment of the present invention.

FIG. 3A shows a process flow 300 used to identify low activity factor (low AF) cells to be replaced with non-standard cells, such as HVT and GBIAS, in accordance with one embodiment of the present invention. At step 301, the data of a particular design are read. At step 302, a timing engine (or timing estimator), is run on the design (or layout) to calculate path delays and a power estimation tool is run to calculate power consumption. In one embodiment, the timing engine is a static timing engine, such as OYSTER. An exemplary power estimation tool is JOULES. At step 303, an instance is selected. At step 304, a decision is made to determine if the instance is on a critical path or not by using the static timing machine (or simulator). Typically, a static timing machine will sort the timings of various paths in the design and identifies the critical path(s), or the path(s) with longest timing(s). If the answer is "yes" (instance on critical path), the instance is left alone (nothing done) and next instance is selected by looping the flow back to step 303. If the answer is "no", which means the instance is not on critical path, the instance is a candidate to be replaced with HVT or GBIAS cell, as shown in FIG. 2. The process then moves to step 305, where activity factor (AF) of the instance is obtained from the power estimation tool, such as JOULES, and slack of the instance from static timing machine, such as OYSTER.

Afterwards, a decision is made on whether the instance meets the criteria of low-AF and high-slack at step 306. The criteria of low-AF are set by the designer. For example, the designer can set the AF threshold to be 15% or 30%. Instances whose AF are less than or equal to 25% or 30% are candidates. The criteria of high-slack are also set by the designer. For example, the design can set the slack threshold to be 15%. Instances whose slack is higher than 15% are candidates. The decision made in step 306 requires both criteria of low-AF and high-slack be met. The percentages listed here are merely an example. Other percentages are also possible. Slack threshold and AF threshold can be determined independently for each block.

If the answer is "yes", the process moves to step 307, which replaces the instance with a GBIAS cell. The polysilicon width of the cell is widened. For example, the program can be set to increase the width by between about 5% to about 20%. The increase in the width is evenly divided on both sides of the polysilicon line to make the center of the polysilicon line (or structure) remain the same. If the answer is "no", a second decision is made at step 308 to determine if the instance meet the criteria of high-AF and high-slack. The criteria of high-AF are set by the designer. For example, the designer can set the AF threshold to be 100%. Instances whose AF are less than or equal to 100% are candidates. The criteria of high-slack are also set by the designer. For example, the design can set the slack threshold to be 15%. Instances whose slack is higher than 15% are candidates. The decision made in step 306 requires both criteria of low-AF and high-slack be met. The percentages listed here are merely an example. Other percentages are also possible. The slack thresholds for high-slack for instances to be replaced with GBIAS cells and with HVT cells can be different.

If the answer is "yes" the instance is replaced with HVT cell at step 309. If the answer is "no", the process continues to step 310. At step 310, a decision is made to find out if all instances in the designed have been checked. Is the answer is "no", the process loops back to step 303 to select another instance from the remaining instances that have not been selected yet. If the answer is "yes", which means all instances of the design have been checked, the static timing machine is run again at step 311 to check the timing of all paths.

At the following step 312, a decision is made to determine if the new design (or revised design), with some instances replaced, meeting timing constraints. The new (or revised) design could create any new critical path(s), which can result from accumulative effects of too many instances on a non-critical path being replaced with GBIAS or HVT cells, and do not meet timing constraints. If the answer is "yes", then the new design (or revised design) can be routed back to step 301 to be checked again to seek opportunities of further improvement, in one embodiment. If the answer is "yes", the process can be moved to the finish step 314 since the entire block of design has been checked and new (or revised) design meets the timing constraints, in another embodiment. If the answer is "no", then the new (or revised) design has created new critical path(s) and affects the performance of the new design to the extent that the new (or revised) block does not meet the timing constraints. Under such a circumstance, the process moves to the step 315 of "stop." Engineer(s) can examine the cells that have been replaced and to put some replaced cells back to their original cells or the engineer(s) can reset the criteria of low-AF at step 306 and/or criteria of high-AF at step 308 to start the process from the beginning of step 301 again. Step 315 allows human intervention to correct the process.

Figure 3B:
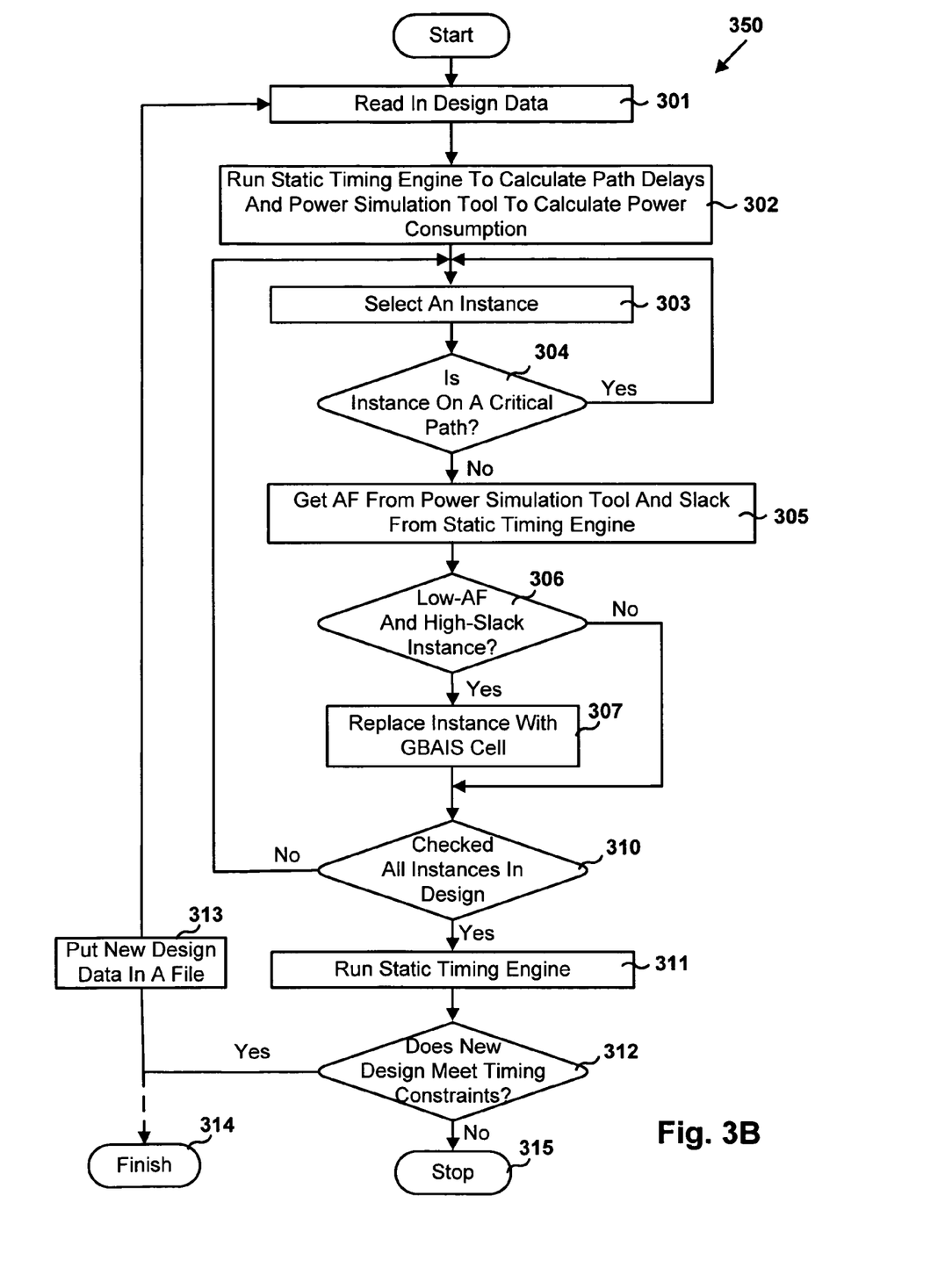
FIG. 3B shows a process flow of replacing instances of a design with power saving gates, in accordance with another embodiment of the present invention.

As mentioned above, HVT cells require extra masking and lithography related processing and increase manufacturing cost. In another embodiment, the process flow shown in FIG. 3A can also skip process steps 308 and 309, which only replaces instances with GBIAS cells. FIG. 3B show a process flow 350 of such a process. Under such circumstance, only cells with low-AF and high-stack are replaced with GBIAS cells. All other cells are left untouched. In yet another embodiment, the process flows in FIGS. 3A and 3B can be expanded to check for cells with low-AF and low-slack, which are replaced with LVT cells, as discussed in FIG. 2.

Figure 4A:
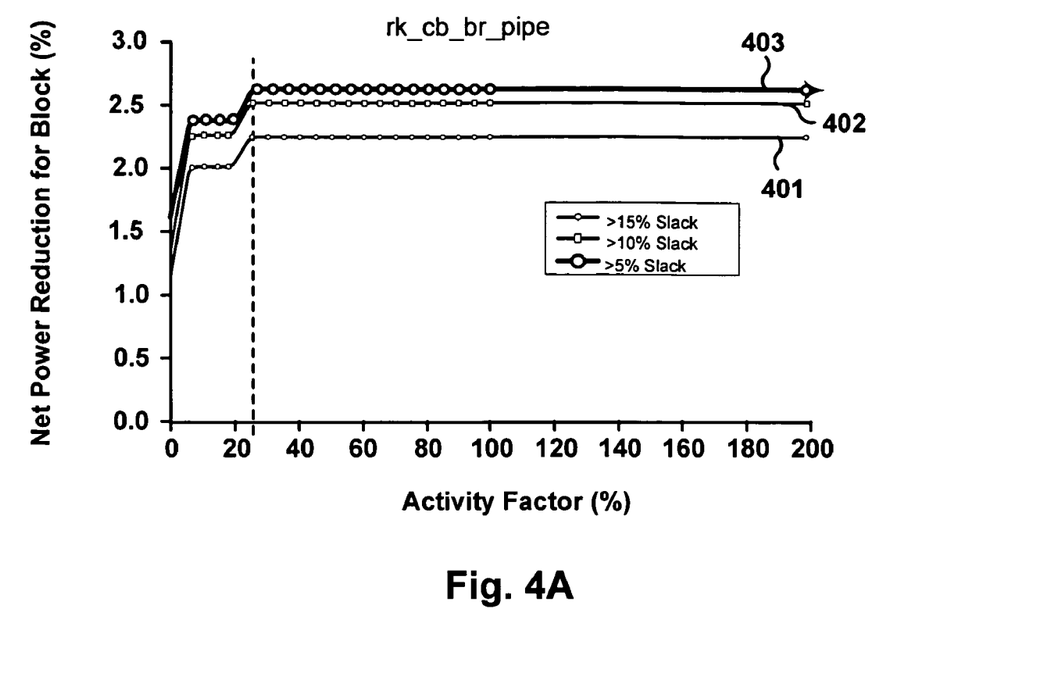
FIG. 4A shows three curves of net power reduction for a block with some gates of the block replaced by GBIAS gates, in accordance with one embodiment of the present invention.

FIG. 4A shows data of net power reduction for a block of a chip, titled "rk_rb_br_pipe", which has undergone the process flow 350 of FIG. 3B. In FIG. 4A, three curves 401, 402, 403 are included. Curve 401 are data of net power reduction of this block where cells with slack greater than or equal to 15% (or slack threshold at 15%) with the AF thresholds indicated in the plot are replace. When the cells with AF thresholds between 5% to about 20% with slack threshold at 15% are changed to GBIAS cells, the net power reduction for the block is about 2%. When the AF threshold is increased to 25%, the net reduction increases to about 2.25%. Net power reduction does not increase when the AF threshold is greater than 25%. Converting additional cells with AF threshold greater than 25% does not improve the net reduction. The power reduction effect by replacing instances with GBIAS cells is off-set by the increase in power consumption due to increase in capacitance of more active instances (or instances with higher AF).

Similar observation can be made for curves 402 (slack threshold at 10%) and 403 (slack threshold at 5%). Since the slack thresholds for curves 402 and 403 are lower, the net power reductions are higher for both curves 402 and 403, in comparison to curve 401. More instances are replaced by GBIAS cells. The increase in net power reduction from 15% slack threshold to 10% slack threshold is higher than the increase from 10% slack threshold to 5% slack threshold.

Figure 4B:
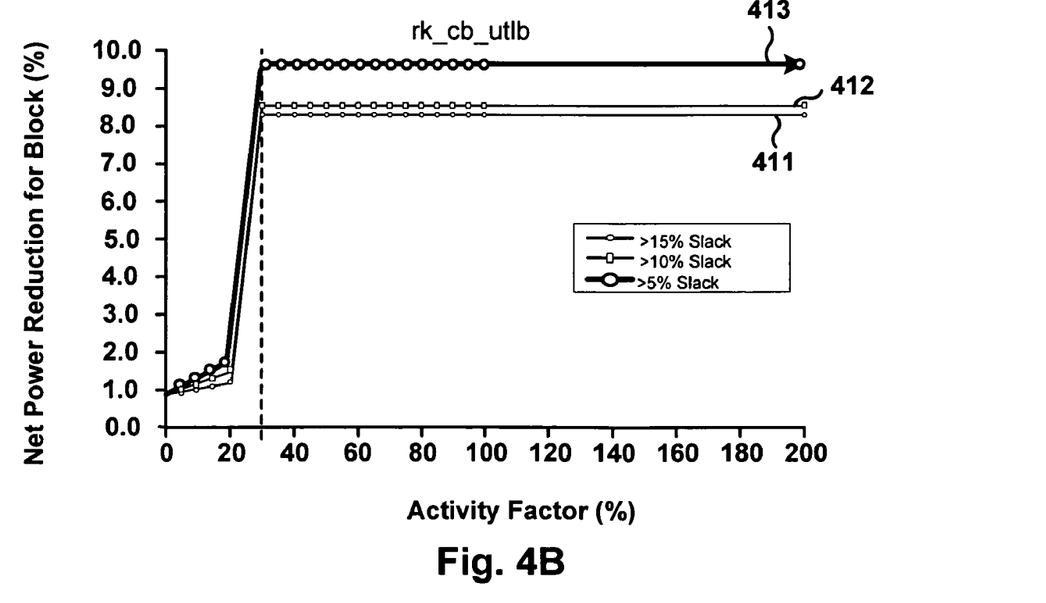
FIG. 4B shows three curves of net power reduction for another block with some gates of the block replaced by GBIAS gates, in accordance with one embodiment of the present invention.

FIG. 4B shows data of net power reduction for another block of the same chip of FIG. 4A, titled "rk_cb_utlb", which has undergone the process flow 350 of FIG. 3B. In FIG. 4B, three curves 411, 412, 413 are included. Similar to curve 401, curve 411 is for slack threshold at 15%. Curve 412 is for slack threshold at 10% and curve 413 is for slack threshold at 5%. Curves 411, 412, and 413 show trends similar to curves 401, 402, and 403 of FIG. 4A. In FIG. 4A, the net power reduction does not change after AF threshold of about 25%. In FIG. 4B, the net power reduction does not change after AF threshold of about 30%. The reason has been explained above. However, the increase in net power reduction from 15% slack to 10% slack is lower than the increase from 10% to 5%. These differences in AF threshold and increase in net power reduction indicate that different blocks in the same chip behave differently. Therefore, the optimal AF threshold and slack threshold can be chosen separately from block to block, since every block is different. Similarly, different chip designs would require different AF thresholds and slack threshold in performing instance replacement.

Figure 4C:
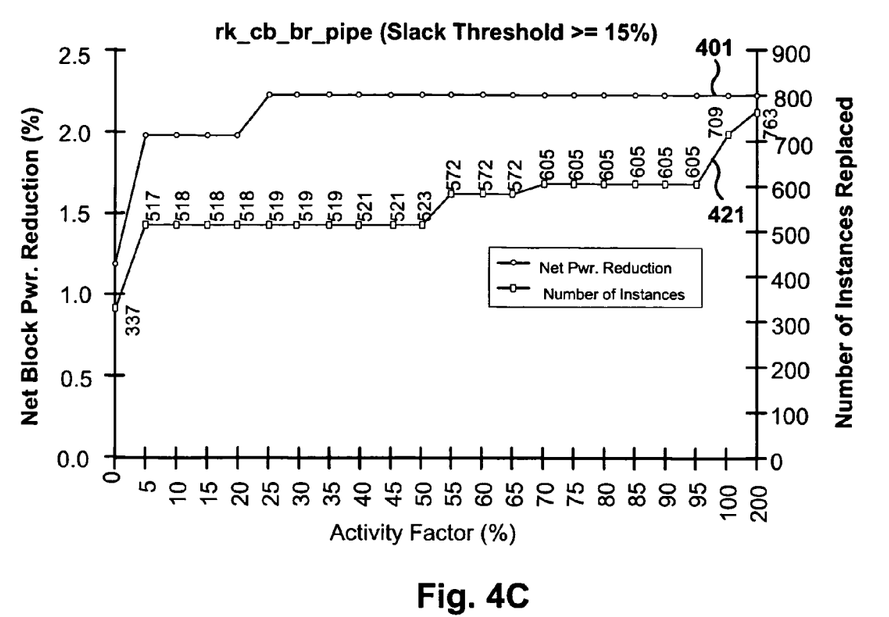
FIG. 4C shows a curve of net power reduction for a block and a corresponding curve of number of instances of the block replaced by GBIAS gates when slack threshold is greater than 15%, in accordance with one embodiment of the present invention.
Figure 4D:
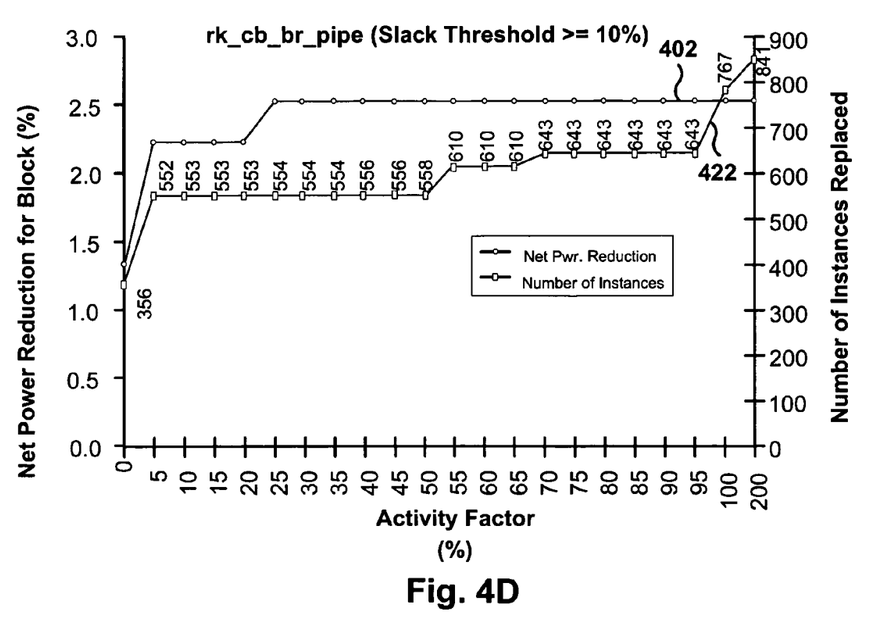
FIG. 4D shows a curve of net power reduction for a block and a corresponding curve of number of instances of the block replaced by GBIAS gates when slack threshold is greater than 10%, in accordance with one embodiment of the present invention.
Figure 4E:
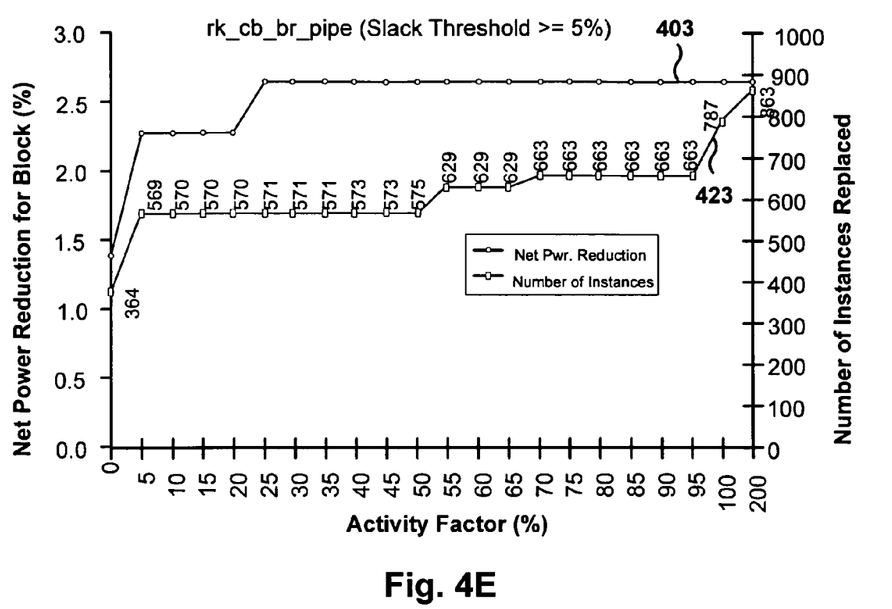
FIG. 4E shows a curve of net power reduction for a block and a corresponding curve of number of instances of the block replaced by GBIAS gates when slack threshold is greater than 5%, in accordance with one embodiment of the present invention.

FIGS. 4C, 4D, and 4E show curves 401, 402, and 403 of FIG. 4A for net power reduction and three additional curves 421, 422, and 423 for number of instances being modified to GBIAS cells. The results show that additional cell modification for AF greater than 25% does not improve the net power reduction. Design resources can be saved by leaving cells with AF greater than 25% alone.

Figure 4F:
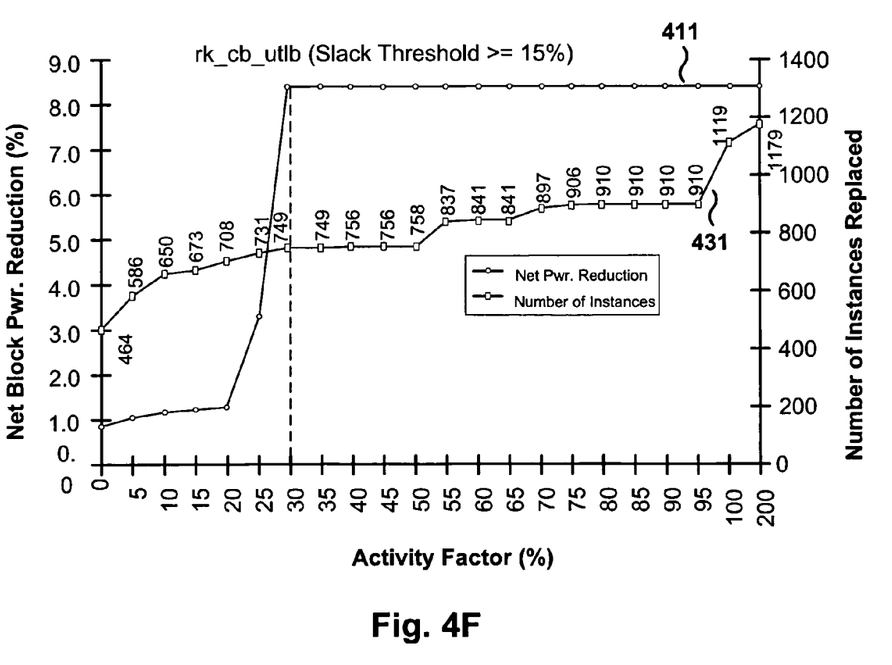
FIG. 4F shows a curve of net power reduction for another block and a corresponding curve of number of instances of the block replaced by GBIAS gates when slack threshold is greater than 15%, in accordance with one embodiment of the present invention.
Figure 4G:
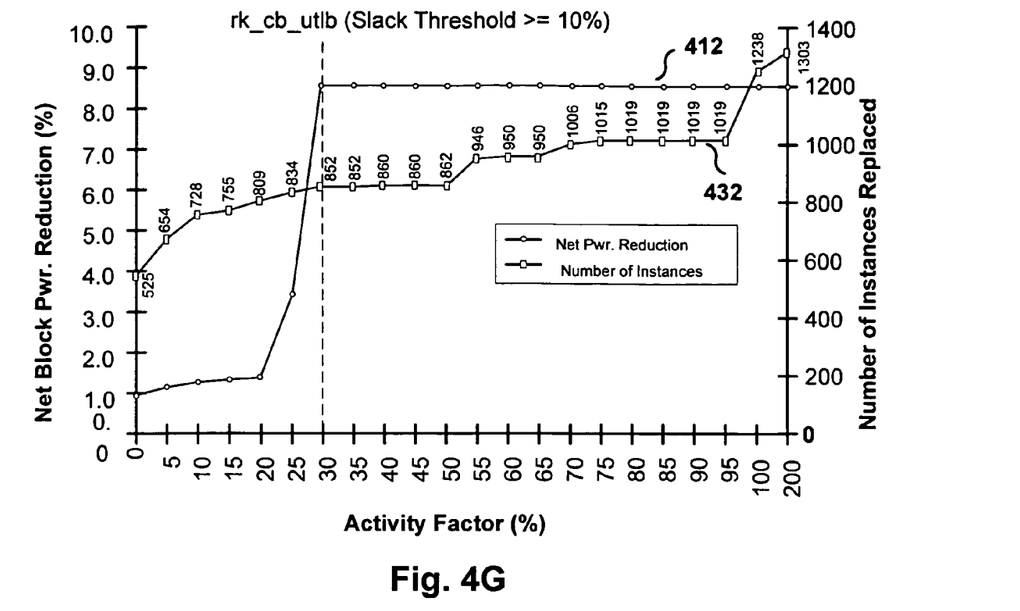
FIG. 4G shows a curve of net power reduction for another block and a corresponding curve of number of instances of the block replaced by GBIAS gates when slack threshold is greater than 10%, in accordance with one embodiment of the present invention.
Figure 4H:
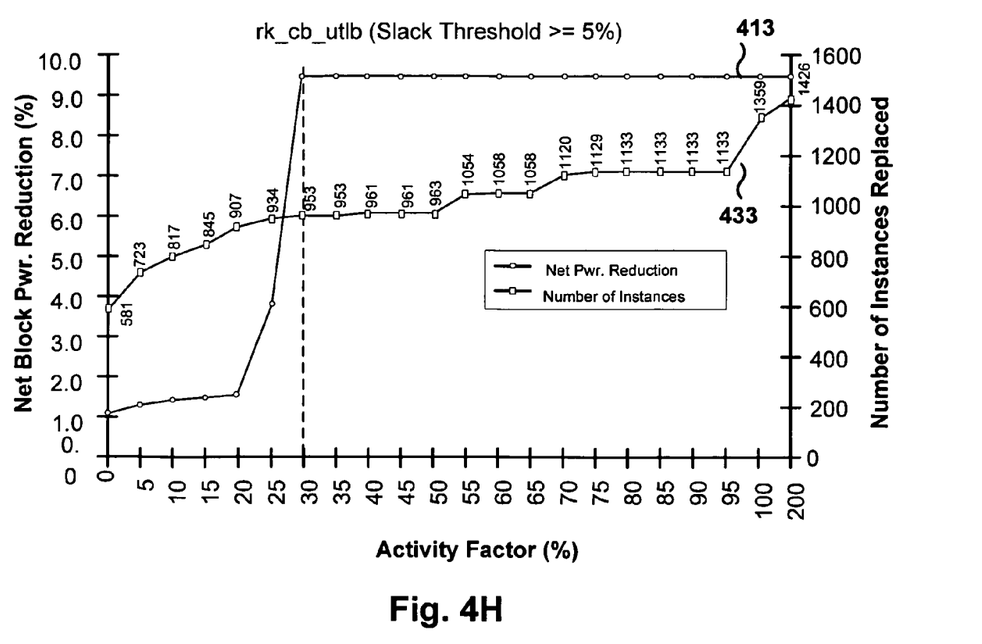
FIG. 4H shows a curve of net power reduction for another block and a corresponding curve of number of instances of the block replaced by GBIAS gates when slack threshold is greater than 5%, in accordance with one embodiment of the present invention.

FIGS. 4F, 4G, and 4H show curves 411, 412, and 413 of FIG. 4B for net power reduction and three additional curves 431, 432, and 433 for number of instances being modified to GBIAS cells. The results show that additional cell modification for AF greater than 30% does not improve the net power reduction. Design resources can be saved by leaving cells with AF greater than 30% alone.

Figure 4I:
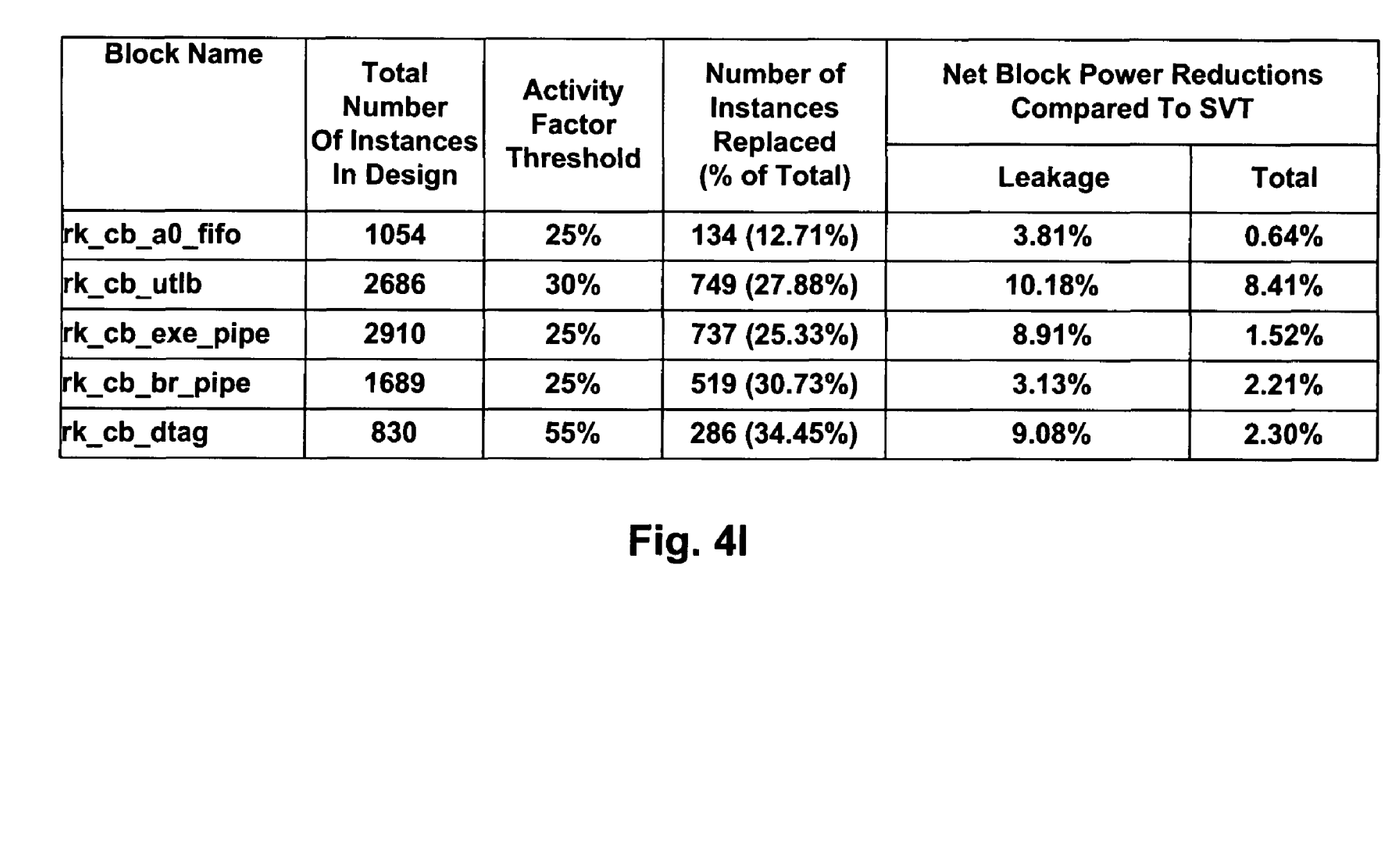
FIG. 4I shows a summary of various blocks on a chip with corresponding instances being replaced by GBIAS gates, corresponding activity factor thresholds, and corresponding net block power reductions, in accordance with one embodiment of the present invention.

FIG. 4I shows a summary of net power reduction of replacing SVT cells with low-AF and high-slack with GBIAS cells. The results compare five blocks of designs in a chip. The first column shows the block name. The second column shows the total number of instances in design being replaced with GBIAS cells. The third column shows the AF threshold, which means the cells (or instances) whose AF equal to or below the threshold are replaced by GBIAS cells. The slack for data in this figure is 15%. The fourth column shows percentage of total instances being replaced with GBIAS cells. The fifth column shows the net block power reductions of the revised design (some instances replaced with GBIAS cells) in comparison to all instances being kept as SVT cells. The net block power reduction results are divided into two small columns, which show net power reduction when the cells are not active (leakage), and the total reduction. The net power reduction varies from block to block. In one block, titled "rk_cb_utlb", the total net block power reduction is 8.41%. The reduction is achieved only by replacing low-AF and high-slack cells fitting the criteria with GBIAS cells. For "rk_cb_utlb" block, about 28% cells are replaced. If the process flow of FIG. 3A is used instead, which replaces high-AF and high-slack cells with HVT cells, the net power reduction can be further increased. The results in FIG. 4I confirm that the optimal AF threshold and slack threshold can be chosen separately from block to block, since every block is different. Similarly, different chip designs would require different AF thresholds and slack threshold in performing instance replacement.

The concept of invention described above can be applied to design of any type of chips that are concerned with speed and power consumption. Chips that are applicable to the concept of invention include, but not limited to, microprocessors, memories, application-specific integrated circuits (ASICs), application specific standard products (ASSPs), system on chip (SOC), network on chip (NOC), etc.

The invention can also be embodied as computer readable code on a computer readable medium. The computer readable medium is any data storage device that can store data, which can be thereafter read by a computer system. The computer readable medium may also include an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of modifying a design of a block of a chip to reduce a net power consumption of the block, comprising operations of:
    (1) read in design data of the block;
    (2) run a static timing engine to calculate path delays and a power estimation tool to calculate power consumption on the design data of the block;
    (3) select an instance of the block, wherein the selected instance has not been selected before the method starts;
    (4) determine if the instance is on at least one critical path,
        if the instance is on the at least one critical path, return to step (3),
        if the instance is not on the at least one critical path, obtain an activity factor (AF) from the power estimation tool and a slack from the static timing engine and move to step (5);
    (5) determine if the instance meets a criteria of low-AF and a first criteria of high-slack,
        if the instance meets the criteria of low-AF and the first criteria of high-slack, the instance is replaced with a gate-length bias (GBIAS) cell,
        if the instance does not meet the criteria of low-AF and the first criteria of high-slack, determine if the instance meets a criteria of high-AF and a second criteria of high-slack
            if the instance meets the criteria of high-AF and the second criteria of high-slack, the instance is replaced with a high threshold voltage (HVT) cell
            if the instance does not meet the criteria of high-AF and the second criteria of high-slack, move to step (6);
    (6) determine if all instances in the block has been selected,
        if all instances in the block have been selected, stop the method, wherein a revised design of the block has been created by the method and the revised design of the block reduces the net power consumption of the block,
        if not all instances have been selected, go to step (3),
    wherein each operation of the method is executed by computer.

2. The method of claim 1, wherein the power estimation tool is a power simulation tool.

3. The method of claim 2, wherein if all instances have been selected in step (6), the method moves to step (6') before the method is stopped, wherein step (6') is described as:
    (6') run static timing engine on the revised design of the block, and determine if at the revised design meets timing constraints for the block,
        if the revised design meets the timing constraints for the block, return to step (1) and use the revised design of the block to provide design data,
        if the revised design does not meet the timing constraints for the block, stop the method.

4. The method of claim 2, wherein the criteria of high-AF is when the AF of the instance is greater than 100%.

5. The method of claim 2, wherein the second criteria of high-slack is when the slack is greater than about 15%.

6. The method of claim 1, wherein the GBIAS cell has a gate width wider than a standard cell in the design of the block by between about 5% to about 20%.

7. The method of claim 1, wherein the instance is a metal-oxide-semiconductor field-effect transistor (MOSFET).

8. The method of claim 1, wherein the criteria of low-AF is when the AF of the instance is less than about 30%.

9. The method of claim 1, where the first criteria of high-slack is when the slack is greater than about 15%.

10. The method of claim 1, wherein the chip is selected from a group consisting of microprocessor, memory, application-specific integrated circuit (ASIC), application specific standard product (ASSP), system on chip (SOC), and network on chip (NOC).

11. The method of claim 1, wherein the first criteria of high-slack, the criteria of high-AF, and the second criteria of high-slack vary from block to block.

12. The method of claim 1, wherein the activity factor (AF) is input AF.

13. A method of modifying a design of a block of a chip to reduce a net power consumption of the block, comprising operations of:
    (1) read in design data of the block;

(2) run a static timing engine and a power estimation tool on the design data of the block;
(3) select an instance of the block, wherein the selected instance has not been selected before the method starts;
(4) determine if the instance is on at least one critical path,
if the instance is on the at least one critical path, return to step (3),
if the instance is not on the at least one critical path, obtain an activity factor (AF) from the power estimation tool and a slack from the static timing engine and move to step (5);
(5) determine if the instance meets a criteria of low-AF and a first criteria of high-slack,
if the instance meets the criteria of low-AF and the first criteria of high-slack, the instance is replaced with a gate-length bias (GBIAS) cell,
if the instance does not meet the criteria of low-AF and the first criteria of high-slack, move to step (6);
(6) determine if the instance meets a criteria of high-AF and a second criteria of high-slack,
if the instance meets the criteria of high-AF and the second criteria of high-slack, the instance is replaced with a high threshold voltage (HVT) cell,
if the instance does not meet the criteria of high-AF and the second criteria of high-slack, move to step (7);
(7) determine if all instances in the block has been selected,
if all instances in the block have been selected, move to step (8),
if not all instances have been selected, go to step (3);
(8) run static timing engine on the revised design of the block, and determine if at the revised design meets timing constraints for the block,
if the revised design meets the timing constraints for the block, return to step (1) and use the revised design of the block to provide design data,
if the revised design does not meet the timing constraints for the block, stop the method,
wherein each operation of the method is executed by computer.

14. The method of claim 13, wherein the GBIAS cell has a gate width wider than a standard cell in the design of the block by between about 5% to about 20%.

15. The method of claim 13, wherein the criteria of low-AF is when the AF of the instance is less than about 30%.

16. The method of claim 13, where the first criteria of high-slack is when the slack is greater than about 15%.

17. The method of claim 13, wherein the criteria of high-AF is when the AF of the instance is greater than 100%.

18. A computer readable storage device storing program instructions for modifying a design of a block of a chip to reduce a net power consumption of the block, comprising:
program instructions for reading in design data of the block at step (1);
program instructions for running a static timing engine and a power estimation tool on the design data of the block at step (2);
program instructions for selecting an instance of the block at step (3), wherein the selected instance has not been selected before the program instructions start;
program instructions for determining if the instance is on at least one critical path at step (4),
if the instance is on the at least one critical path, return to step (3),
if the instance is not on the at least one critical path, obtain an activity factor (AF) from the power estimation tool and a slack from the static timing engine and move to step (5);
program instructions for determining if the instance meets a criteria of low-AF and a first criteria of high-slack at step (5),
if the instance meets the criteria of low-AF and the first criteria of high-slack, the instance is replaced with a gate-length bias (GBIAS) cell,
if the instance does not meet the criteria of low-AF and the first criteria of high-slack, determine if the instance meets a criteria of high-AF and a second criteria of high-slack,
if the instance meets the criteria of high-AF and the second criteria of high-slack, the instance is replaced with a high threshold voltage (HVT) cell,
if the instance does not meet the criteria of high-AF and the second criteria of high-slack, move to step (6);
program instructions for determining if all instances in the block has been selected at step (6),
if all instances in the block have been selected, stop the program instructions, wherein a revised design of the block has been created and the revised design of the block reduces the net power consumption of the block,
if not all instances have been selected, go to step (3),
wherein each of the program instructions is executed by a computer.

19. The computer readable storage device of claim 18, wherein
the power estimation tool is a power simulation tool.

20. The computer readable storage device of claim 18, wherein if all instances have been selected in step (6), the program instructions move to step (6') before the program instructions are stopped, wherein step (6') is described as:
program instructions for running static timing engine on the revised design of the block, and determine if at the revised design meets timing constraints for the block,
if the revised design meets the timing constraints for the block, return to step (1) and use the revised design of the block to provide design data,
if the revised design does not meet the timing constraints for the block, stop the method.

* * * * *